(12) United States Patent
Sullivan et al.

(10) Patent No.: US 6,929,267 B2
(45) Date of Patent: Aug. 16, 2005

(54) SNOW SCOOTER AND METHOD OF USING SNOW SCOOTER

(76) Inventors: Daniel J. Sullivan, P.O. Box 478, South Lyme, CT (US) 06376; James W. Anthony, 18 Fernwood La., Somers, CT (US) 06071

(*) Notice: Subject to any disclaimer, the term of this patent is extended or adjusted under 35 U.S.C. 154(b) by 33 days.

(21) Appl. No.: 10/349,671

(22) Filed: Jan. 23, 2003

(65) Prior Publication Data

US 2003/0214105 A1 Nov. 20, 2003

Related U.S. Application Data

(60) Provisional application No. 60/360,041, filed on Feb. 27, 2002.

(51) Int. Cl.⁷ ............................................. B62M 29/00
(52) U.S. Cl. ............................... 280/14.28; 280/14.21; 280/14.27; 280/21.1
(58) Field of Search ......................... 280/14.27, 28.11, 280/14.28, 14.25, 21.1, 22.1, 87.041, 87.042, 603, 609, 11.14, 11.15, 809, 817, 818, 14.21, 15, 17, 16

(56) References Cited

U.S. PATENT DOCUMENTS

| 1,330,644 | A |   | 2/1920  | Matson |  |
|-----------|---|---|---------|--------|--|
| 1,644,623 | A |   | 10/1927 | Ahn    |  |
| 1,723,966 | A | * | 8/1929  | Blomstrand | 280/14.28 |
| 1,968,975 | A |   | 9/1934  | Upsacker et al. | |
| 2,006,325 | A |   | 6/1935  | Scholtes | |
| 2,101,229 | A |   | 12/1937 | Anderson et al. | |
| 2,497,995 | A |   | 2/1950  | Julie | |
| 2,894,760 | A |   | 7/1959  | Kolstad | |
| 3,269,742 | A |   | 8/1966  | Funyak et al. | |
| 3,361,436 | A |   | 1/1968  | Williams | |
| 3,529,847 | A | * | 9/1970  | Shores | 280/14.22 |
| 3,717,359 | A |   | 2/1973  | Peronnon | |

(Continued)

FOREIGN PATENT DOCUMENTS

| DE | 3702092 A1 | * | 8/1988 | ............ A63C/5/03 |
| DE | 10102340 A1 | * | 7/2002 | ........... B62B/13/04 |

*Primary Examiner*—J. Allen Shriver
(74) *Attorney, Agent, or Firm*—McCormick, Paulding & Huber LLP

(57) ABSTRACT

An apparatus is attachable to a conventional snowboard to convert the snowboard into a snow scooter having improved performance characteristics in comparison to those of the snowboard alone. The apparatus includes a member movable relative to the snowboard by either the hands or feet of the rider, and forces and motions applied to that member by the rider are converted by an associated motion and force transmitting mechanism into twisting motions of the rear portion of the snowboard relative to the front portion of the snowboard, allowing the scooter rider to better perform turns and other maneuvers during the riding of the scooter and also allowing the rider to ride the snow scooter without foot bindings fixing his feet to the scooter.

33 Claims, 14 Drawing Sheets

U.S. PATENT DOCUMENTS

| | | | |
|---|---|---|---|
| 4,161,323 A | | 7/1979 | Wetteland |
| 4,533,150 A | | 8/1985 | Hardy |
| 4,708,353 A | | 11/1987 | Evequoz |
| 5,249,816 A | | 10/1993 | Southworth |
| 5,351,975 A | * | 10/1994 | Petoud .................... 280/14.28 |
| 5,411,282 A | | 5/1995 | Shannon |
| 5,516,126 A | | 5/1996 | Myers |
| 5,558,354 A | * | 9/1996 | Lion ......................... 280/607 |
| 5,613,695 A | * | 3/1997 | Yu ........................... 280/14.25 |
| 5,685,201 A | * | 11/1997 | Renshaw .................. 74/551.2 |
| 5,904,056 A | | 5/1999 | Ozaki |
| 6,139,031 A | | 10/2000 | Wingard |
| 6,234,042 B1 | | 5/2001 | An |
| 6,279,924 B1 | * | 8/2001 | Murphy et al. .......... 280/14.23 |
| D451,162 S | * | 11/2001 | Spiers ....................... D21/767 |
| D466,833 S | * | 12/2002 | Pan .............................. D12/8 |
| 6,648,347 B1 | * | 11/2003 | Rieg ....................... 280/14.25 |
| 6,652,422 B1 | * | 11/2003 | Day ............................ 482/51 |
| 6,702,328 B2 | * | 3/2004 | Malleis et al. .............. 280/809 |
| 6,736,414 B2 | * | 5/2004 | Farrally-Plourde ........... 280/16 |
| 2001/0038184 A1 | | 11/2001 | Stafford |
| 2002/0008360 A1 | | 1/2002 | Ellington |
| 2002/0030333 A1 | | 3/2002 | Graham |
| 2002/0060436 A1 | | 5/2002 | Spiers |
| 2002/0070515 A1 | * | 6/2002 | Barbieri et al. .......... 280/14.21 |
| 2002/0121752 A1 | | 9/2002 | Gille et al. |
| 2002/0158430 A1 | * | 10/2002 | Farcot et al. ............. 280/14.21 |
| 2003/0067127 A1 | | 4/2003 | McClure et al. |
| 2003/0085537 A1 | * | 5/2003 | Breuer et al. ............. 280/14.21 |
| 2003/0160404 A1 | * | 8/2003 | Bobrowicz ............... 280/14.21 |
| 2003/0209901 A1 | * | 11/2003 | Hamel ....................... 280/809 |
| 2004/0007838 A1 | * | 1/2004 | Farmer .................... 280/14.27 |
| 2004/0017052 A1 | * | 1/2004 | Takahashi ................ 280/14.28 |
| 2004/0075227 A1 | * | 4/2004 | Jungnickel ............... 280/14.21 |

* cited by examiner

SNOW SCOOTER AND METHOD OF USING SNOW SCOOTER

CROSS REFERENCE TO RELATED APPLICATIONS

This application is a nonprovisional application claiming an invention disclosed in prior U.S. Provisional Application No. 60/360,041 filed on Feb. 27, 2002, and names as the inventors the same inventors as named in said provisional application, whose invention is claimed in the claims of this application. The benefit of the Feb. 27, 2002 filing date of the provisional application is claimed for this nonprovisional application and the content of said provisional application is hereby incorporated into this application by reference.

FIELD OF THE INVENTION

This invention relates to a snow sport device, referred to herein as a "snow scooter", which device is comprised of a snowboard, which may be of conventional design, and an apparatus attached to the snowboard giving the board enhanced performance capabilities in comparison to the board as used by it self. Since the snow scooter of the invention may often be formed by the seller or user of the scooter combining a snowboard acquired from one source and an apparatus acquired from another source, the following combination claims are drawn to the apparatus by itself; but the invention resides also in snow scooters as made by attaching the claimed apparatus to snowboards. The invention also relates to a method for using a snow scooter such as aforesaid.

GLOSSARY

As used herein, various skiing and snowboarding terms have the following meanings:

Slope:

An inclined surface such as the side of a hill or mountain.

Ski slope:

A slope, normally clear of obstacles, for skiers and snowboarders to descend.

Snowboarder:

The operator or "rider" of a snowboard or of the snow scooter of this invention.

Fall line:

An imaginary line running from the top of a ski slope to the bottom of the ski slope. If a bowling ball were allowed to freely roll down a ski slope the ball would follow a track along the fall line. The fall line may also be defined as the line which describes the shortest distance from the top of a slope the to bottom of the slope.

Uphill:

The direction toward the top of the slope.

Downhill:

The direction toward the bottom of the slope.

Traverse:

The act of moving across a slope from one side toward the other side at an angle to the fall line which angle is greater than zero degrees (directly down the fall line) and less than 180 degrees (directly up the fall line).

Uphill edge:

When traversing across a slope with a snowboard, the edge of the snowboard on the uphill side of the snowboard. When traversing the uphill edge of the snowboard normally exerts more pressure on the snow surface than does the downhill edge.

Downhill edge:

When traversing a slope, the edge of the snowboard on the downhill side of the snowboard.

Weighted edge:

The edge of the snowboard which is carrying the weight of the snowboard rider.

Unweighted edge: The edge of the snowboard which is not carrying the weight of the snowboard rider.

BACKGROUND OF THE INVENTION

A proliferation of different brands of snowboards is available on the market today and the mode of operation is basically the same for all. Typically the snowboarder's feet are fastened securely to the snowboard by a set of two bindings, one forward and one aft, which attach by one means or another to the boots worn on the snowboarder's feet. The snowboarder's feet are in effect intimately "locked" to the snowboard through these bindings.

The sides of a traditional snowboard are curved in such a manner that the board is wider at its forward and rear position, and narrower at its middle or waist portion, similar to the construction of an alpine ski. This curvature of the sides of a ski or snowboard is known as "side camber" or "side cut". Side cut is the snowboard feature that allows the rider to maintain a turn in either direction. In general most snowboards are flexible both in bending along the longitudinal axis, as well as in torsion about the longitudinal axis. It is the torsional flexibility that allows the board to be twisted by using the feet to apply opposing forces through the bindings.

A snowboard rider normally stands on the board with his feet approximately perpendicular to the snowboard longitudinal axis. The angle of the feet relative to the snowboard may vary widely, but for most riders it is somewhere in the range between 0 and 45 degrees forward of perpendicular. The difference is a matter of rider preference, relating to comfort and performance. The snowboarder may also choose to ride the board with either his right foot forward or his left foot forward. To make the following discussion general, the two edges (sides) of the snowboard are referred to respectively, as the toe edge and the heel edge.

As with alpine skiing, turns on a snowboard can be executed in a number of ways; however, the four most common methods for turning are as follows:

Carving turn—by shifting weight and rocking the board onto one edge or the other, the rider can cause the snowboard to turn in the direction it is rocked, i.e. rocking to the right for a right turn, rocking to the left for a left turn. The "side cut" and flex of the snowboard combine to allow the snowboard to follow a curvilinear path when one curved edge of the snowboard is weighted and, as a result, cuts into the snow surface such that a turn is executed without slipping or sliding sideways across the snow surface.

Skidding turn—by twisting the snowboard (opposing heel and toe pressure), the rider can cause the front edge to bite, and the rear edge to release and slide.

Slipping turn—by twisting the snowboard (again opposing heel and toe pressure), the rider can cause the front edge to release and slide, and the rear edge to bite.

Jumping turn—by either jumping upwardly, or launching off a bump, the rider can get the snowboard off the snow, shift the snowboard in the air, then land in a new direction.

To propel a snowboard forward on flat surfaces or up slight grades it is necessary to release the rear foot from its binding and use it to push against the snow surface to slide the snowboard ahead. Generally the rear foot must also be released from its binding when riding up the chair lift such that the snowboard dangles from the front foot by its binding to the board.

When riding a snowboard in the traditional manner the rider's booted feet are securely fastened to the snowboard through a binding system. The rider's feet are fastened to the top surface of the snowboard at an angle which is typically within 45 degrees of being perpendicular to the longitudinal axis of the snowboard. Many riders set their bindings such that their feet are 90 degrees to the longitudinal axis of the board so that they can ride the snowboard either forwardly or backwardly with the same degree of ease. Consequently when a rider looses his balance he either falls forwardly onto his knees or backwardly onto his posterior.

To protect the knees and/or posterior the rider's natural instinct is to catch himself on his hands to brake the fall. Medical records show that the most common injuries to snowboarders are to the wrist, shoulders and rotator cuff. There is also an increasing incidence of lower leg, tibula and fibula, bone fractures due to the lack of snowboard safety bindings combined with the use of stiffer "ski type" plastic boots.

The object of the invention is to provide a means enabling the riding of a snowboard without having one's feet securely attached to the snowboard, so as to eliminate those falls and injuries that could arise as a result of having one's feet securely attached to the snowboard. A further object of the invention is to provide riders of snowboards with a different and more enjoyable riding experience, particularly for those riders who are uncomfortable with the traditional manner of riding a snowboard.

SUMMARY OF THE INVENTION

The present invention provides a means for a snowboarder to "ride", steer, or otherwise manipulate a snowboard without having his feet "locked" to the snowboard through the traditional binding system. The present invention resides in an apparatus which can be attached to a traditional snowboard to convert that traditional snowboard into an improved snowboard, or snow scooter, including a means for permitting the rider to control and maneuver the snowboard in the same manner as though his feet were attached to it. In particular the apparatus of the invention, when in a condition of being attached to a snowboard, includes a member movable by a rider positioned at the middle portion of the board, back and forth along a given path, and a mechanism connected with that member for twisting the rear portion of the snowboard back and forth about the longitudinal axis of the snowboard relative to the front portion of the snowboard in response to the movement of the member along the given path.

BRIEF DESCRIPTION OF THE DRAWINGS

The detailed descriptions of embodiments of the invention which follow will be better understood when taken in conjunction with the accompanying drawings, wherein.

DETAILED DESCRIPTION OF THE PREFERRED EMBODIMENTS

Figure 1:
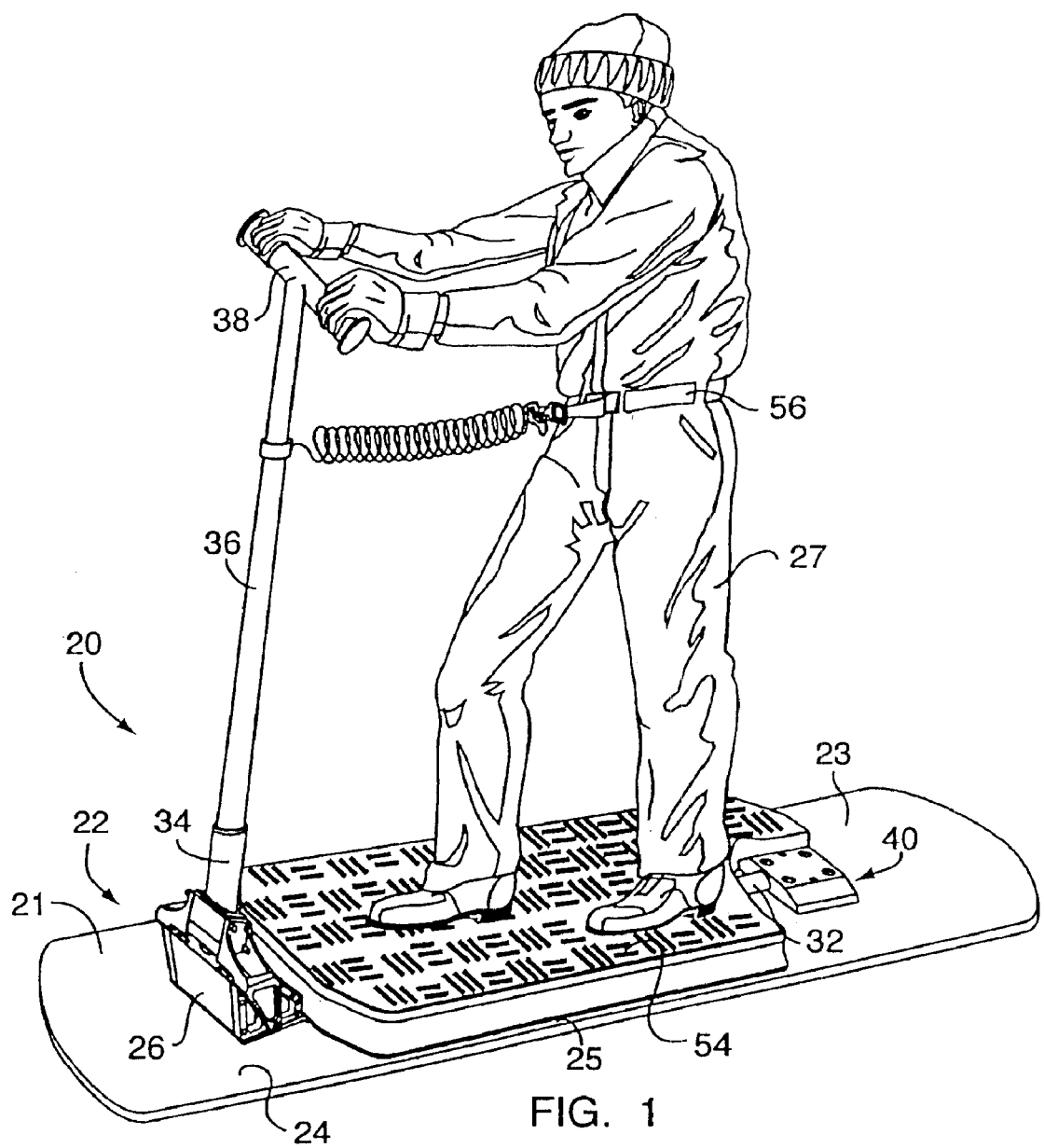
FIG. 1 is a perspective view of a snow scooter embodying the invention in the process of being ridden by a rider.

Referring first to FIGS. 1 to 6, the invention involves a snow scooter 20 made up of an apparatus 22 and a snowboard 24, which snowboard 24 may be of generally conventional construction. In the illustrated case the apparatus 22 mounts onto the snowboard 24 utilizing both the front and rear sets of factory installed binding mounting holes with threaded inserts. The snowboard 24 has a front portion 21, a rear portion 23, and a middle portion 25. During use of the snow scooter 20 a rider 27 positions himself on the middle portion 25. In the illustrated case it is expected that the rider 27 will stand, as shown in FIG. 1, in the middle portion 25, but it is possible that the snow scooter 20 may also include a seat at the middle portion to allow the rider to assume a seated position while riding the scooter.

The apparatus 22 is comprised of four major components:

A foremost component attached to the snowboard utilizing the front-most set of existing mounting holes, hereinafter referred to as a "front plate assembly" 26. The front plate assembly 26 consists of a base plate 28 which mounts directly to the board using threaded fasteners, an attachment means 30 for mounting the foremost part of a torsion transferring member or torque tube assembly 32 as described below, and an attachment means 34 for mounting a vertical control member 36.

The vertical control member 36 attached to the front plate assembly 26. The vertical control member 36 is topped with a grip member in the form of a T-handle 38, or other variety of handle, grippable by a rider's hands. The vertical control member 36 is part of a motion transmitting mechanism for transferring motions and forces applied to the handle 38 by the rider to the edges of the snowboard to cause the board to turn. The vertical control member 36 and the rest of the motion and force transferring mechanism takes the place of the boot and binding interface which has traditionally been used to control and steer the board and eliminates the need for the rider to be physically locked to the snowboard.

A rearmost component attached to the snowboard 24 utilizing the rearmost set of existing mounting holes in the snowboard, and referred to as the "rear plate assembly 40". The rear plate assembly 40 comprises a base plate 42 which mounts directly to the snowboard using threaded fasteners and a suitable attachment means (not shown) for fixing the rear plate assembly 40 to the rear end of the torsion transferring member 32.

The torsion transferring member, or torque tube assembly 32, with attachment points respectively, at its foremost end and its rearmost end the torque tube assembly 32 is attached to the front plate assembly 26 and to the rear plate assembly 40 so as to allow torque to be transferred from the front plate assembly 26 to the rear plate assembly 40 without interfering with the longitudinal flexibility of the snowboard, i.e.: the bending of the snowboard 24 from front to back about an axis generally perpendicular to the longitudinal axis of the snowboard.

The vertical control member 36 during use of the scooter extends generally vertically upwardly from the snowboard 24 and is restrained by the front plate assembly 26 against all movement relative to the snowboard except for torsional movement about its vertical axis.

Figure 4:
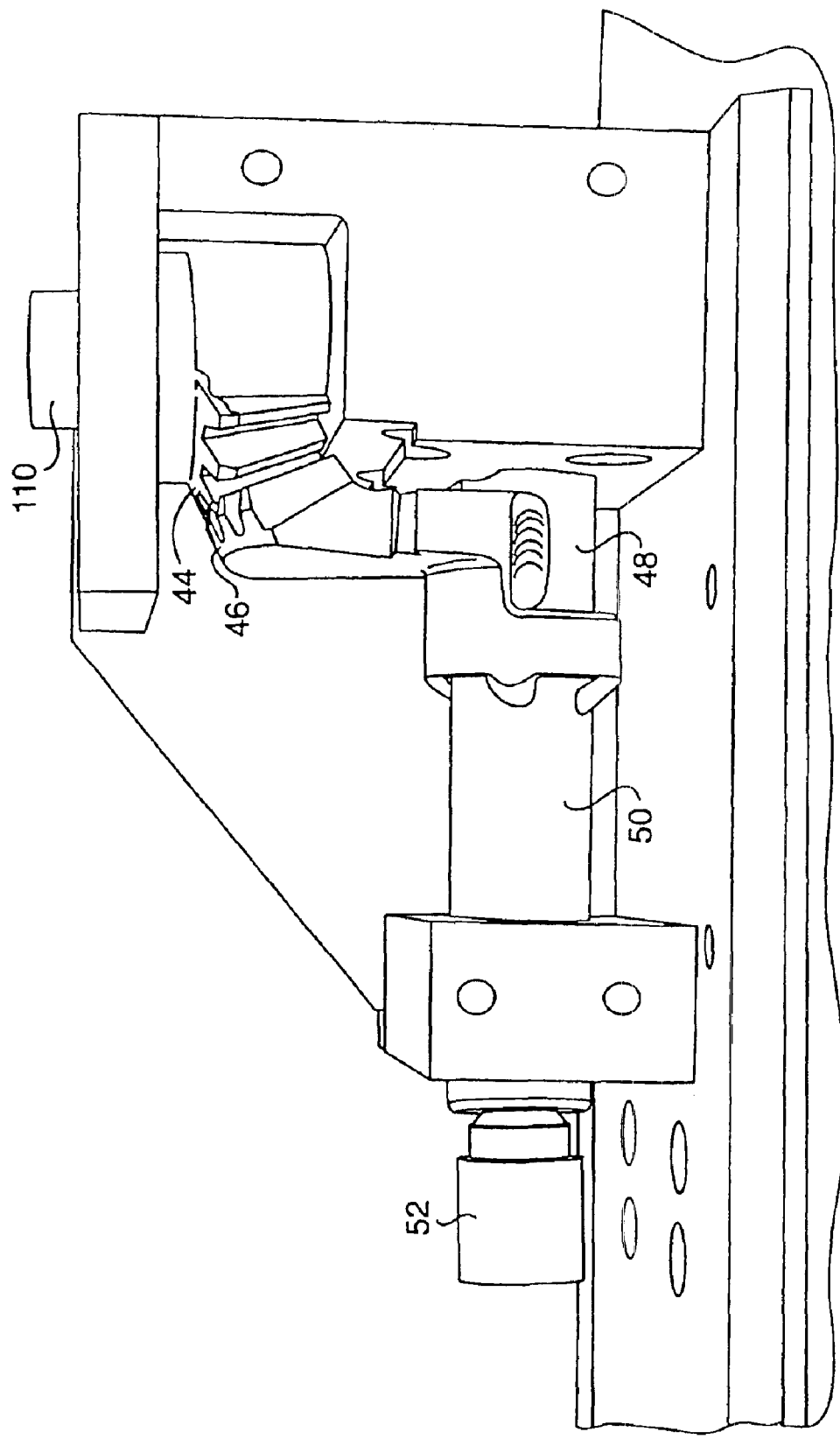
FIG. 4 is a perspective fragmentary and more enlarged scale view, with still further parts removed in comparison to FIG. 3, showing further parts of the apparatus in greater detail.
Figure 5:
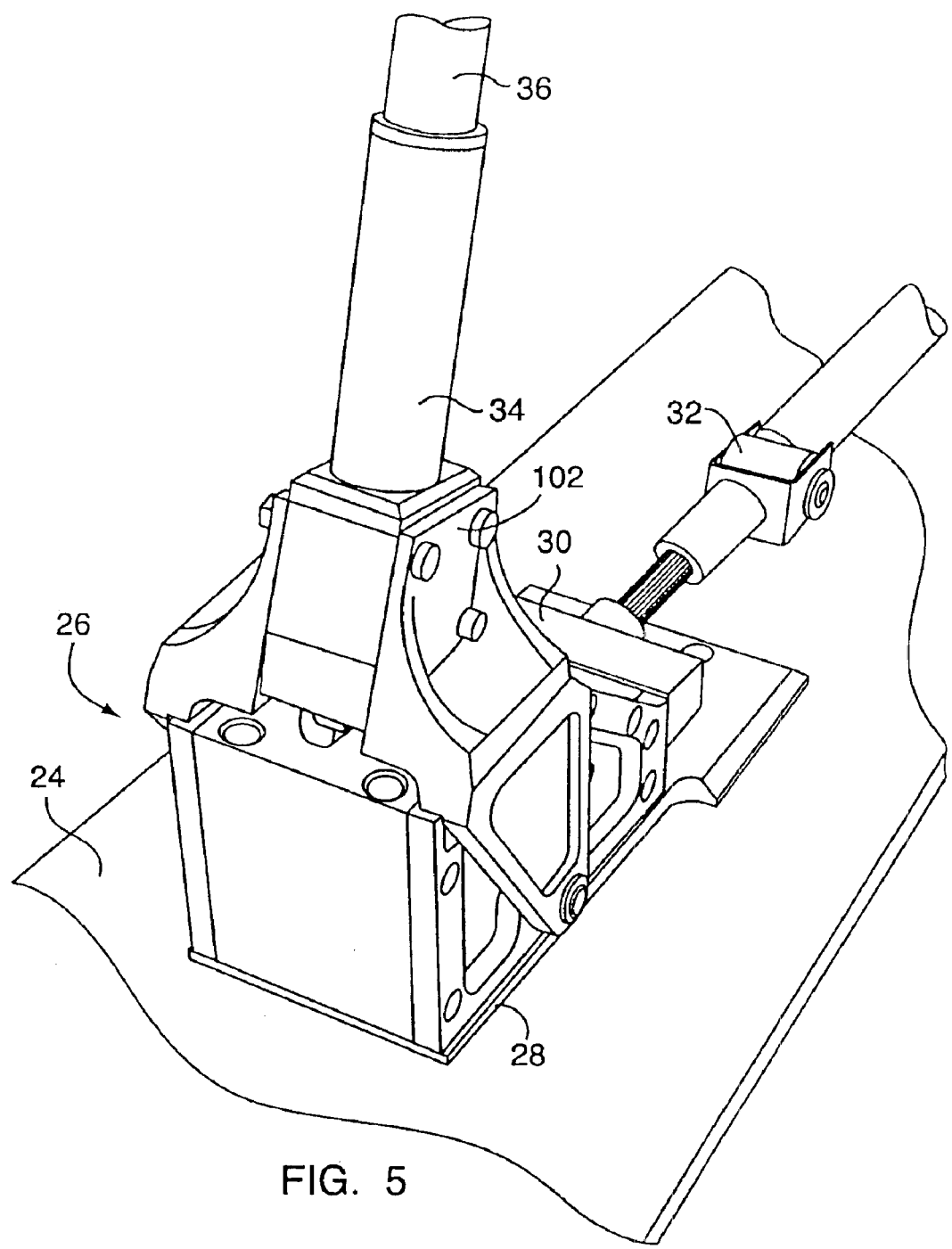
FIG. 5 is a view of substantially the same portion of the apparatus as in FIG. 4, but taken from a different point of view and with parts omitted in FIG. 4 shown in place.

Transfer of torsional motion and forces from the vertical control member 36 to the torque tube assembly 32 may be accomplished, among other ways (for example, pneumatics, hydraulics, cams, cable/pulley or levers) by use of a universal joint, a flexible shaft, a bevel gear combination, portions of a bevel gear combination, or a tongue and fork set of parts. In the illustrated case a pair of bevel gear segments 44 and 46 is used as seen in FIG. 4, the segment 44 being fixed to the lower end of the vertical control member 36 and the segment 46 being fixed to a horizontal stub shaft 48 rotatably supported by the assembly 26 and connected to the forward end of the torque tube assembly 32. Transfer of torsional forces from the torque tube assembly 32 to the rear plate assembly 40 may be accomplished, among other means, by use of square, rectangular, splined or keyed shafts which transmit torque but at the same time allow the length of the shaft to change so as not to interfere with the longitudinal flexibility of the snowboard. In the illustrated case a telescopic spline shaft connector is used as shown at 50 in FIG. 4. Because the snowboard flexes or bends while traveling over the snow surface the distance between the front mounting plate 28 and the rear mounting plate 42 changes and the vertical distance between the snowboard's top surface and the midpoint of a line stretched between the front and rear mounting plates changes. The torque tube assembly 32 accommodates these changes in distance by using the spline shaft connector 50 to compensate for the change in longitudinal distance and a universal joint 52 to allow the torque tube assembly to deflect through a vertical plane when the snowboard bends along its longitudinal axis.

The vertical control member 36 during riding of the scooter is restrained by the front plate assembly 26 against all movement relative to the snowboard 24 except for rotation about the own longitudinal (vertical) axis. Steering of the scooter 20 is initiated by rocking the vertical control member 36 through a vertical plane normal to the longitudinal axis of the snowboard 24. When the vertical control member is rocked to the left side the vertical member acts as a lever arm and causes the snowboard 24 to rock up onto its left side edge. The side cut or side camber (curve) of the snowboard's left edge then cuts into the snow surface and causes the board to turn in the direction toward which the vertical control member 36 was pushed thus initiating a left turn. Similarly when the vertical control member 36 is rocked to the right side the action causes the snowboard to rock up onto its right side edge. The side cut or side camber of the snowboard's right edge cuts into the snow surface and causes the board to turn in the direction toward which the vertical control member 36 was pushed thus initiating a right turn. Due to the torsional flexibility along the longitudinal axis of the snowboard the portion of the edge at the rear of the snowboard tends to exert less pressure on the snow surface than the portion of the edge at the forward portion of the snowboard, which may result in the rear portion of the board sliding on the snow surface rather than cutting into the snow surface. This effect may result in the rear of the board skidding in the downhill direction causing the board to oversteer and the operator to loose directional control. In order to correct this effect it is necessary to increase the pressure exerted on the snow surface by the rear portion of the snowboard's edge.

The scooter 20 is provided with means enabling a counteracting of the torsional flexibility along the longitudinal axis of the snowboard by transferring rider applied torsional forces from the T-handle 38 to the rear edges of the snowboard. With the vertical control member 36 is rocked clockwise toward the right side of the snowboard 24 the T-handle bar is forcefully rotated counterclockwise in a horizontal plane normal to the vertical axis of the vertical control member 36. The torsional force is transferred from the vertical control member 36 through the front plate assembly 26 and, by means of the torque transferring means 32, to the rear plate assembly 42 thus twisting the board along the longitudinal axis and causing a downward force to be applied to the right rear edge of the snowboard resulting in an equalization of force (weighting) along the entire right edge of the board and causing the edge to bite into the snow preventing the rear of the board from skidding sideways down the slope towards the left side. Likewise, with the vertical control assembly rocked counterclockwise toward the left side of the snowboard the T-handle bar is forcefully rotated clockwise in a horizontal plane normal to the vertical axis of the vertical control member 36. The torsional force is transferred from the vertical control member 36 through the front plate assembly and, by means of a torque transferring means, to the rear plate assembly thus twisting the board along the longitudinal axis and causing a downward force to be applied to the left rear edge of the snowboard resulting in an equalization of force (weighting) along the entire left edge of the board and causing the edge to bite into the snow preventing the rear of the board from skidding sideways down the slope towards the right side.

The above described apparatus 22 allows a snowboard to be controlled (steered) in the same manner as it would be controlled by a snowboarder using his legs and feet to exert forces through snowboard bindings to the front and rear binding mounting portions of the snowboard causing the board to rock up onto one edge or the other or causing a twisting of the board along the longitudinal axis such that the front portion of the board is twisted one way or the other with respect to the rear portion of the board.

The snow scooter 20 also preferably includes a foot platform 54 which covers the torque tube assembly 32 and provides a wide flat surface in the middle portion of the snowboard 24 for contact with the rider's feet. This platform 54 may be of various construction, some preferred ones of which are described in detail hereinafter.

The above material describes the basic features of the snow scooter 20 and related apparatus 22 comprising an embodiment of the invention. A snow scooter embodying the invention may, however, include, if wanted, other features, as described in more detail below constituting advantageous refinements of and improvements to the basic invention.

Referring to FIG. 1, the snow scooter 20 may be equipped with a retaining leash or tether 56 attaching the snow scooter 20 to the rider to keep the snow scooter from "getting away" from the rider when the two "part company". The tether is securely attached to the snow scooter at one end and to the rider at the other end. The tether is preferably in the form of a spring coil, recoil cord, or other non-obtrusive construction which is designed to minimize the possibility of snagging on chair lift structures, brush, or the neck of the rider.

Figure 6:
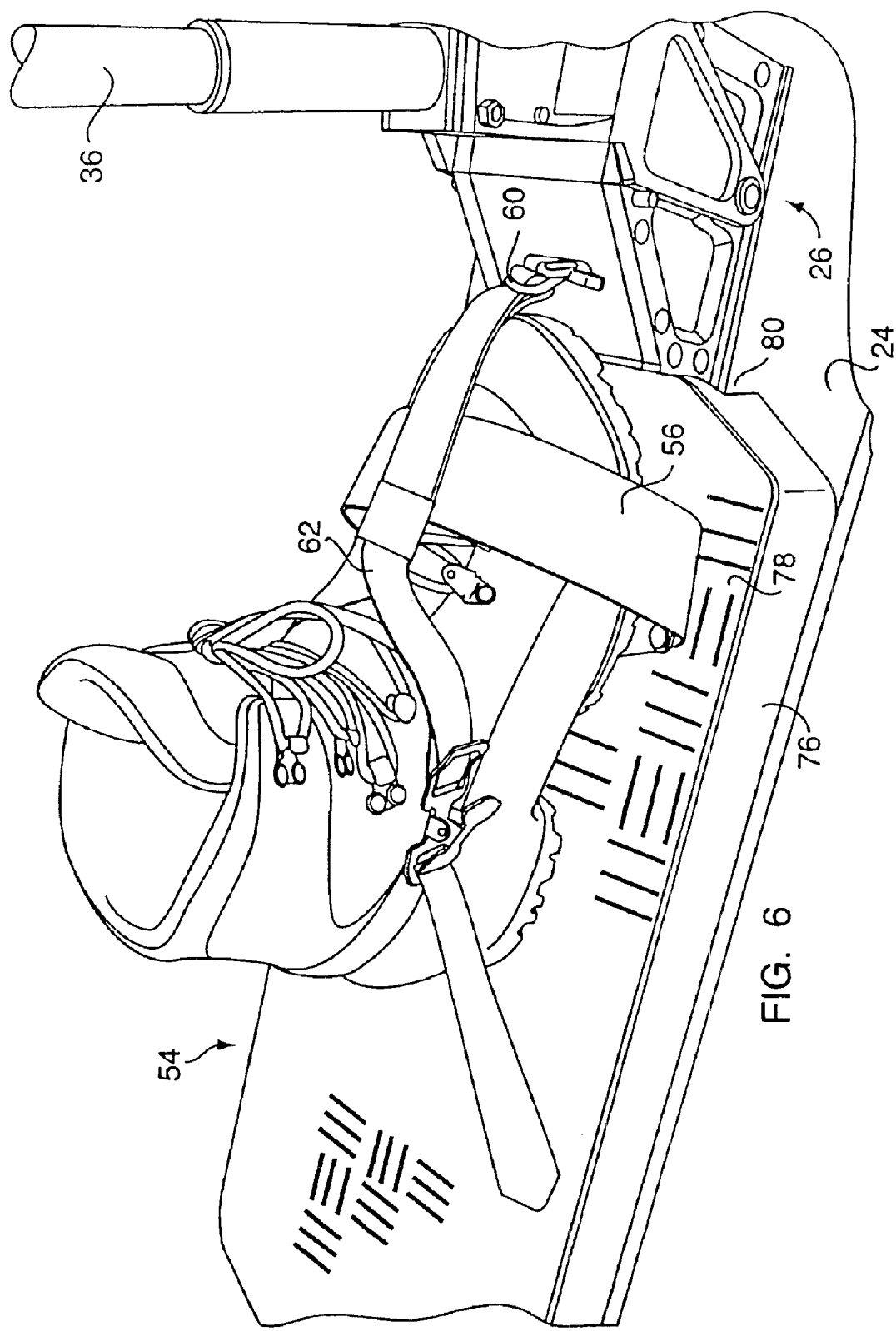
FIG. 6 is a perspective view showing a boot strap and tether arrangement for use by a rider when riding a chair lift with the snow scooter of FIG. 1.

As shown in FIG. 6, the snow scooter 20 may also be equipped with a foot strap 56 for transporting the snow scooter 20 up the mountain on a chair lift. The foot strap is attached directly to the snow scooter's foot platform 54, so that a booted foot may be hooked into the foot strap as a means of transporting the snow scooter 20 while the snow scooter rider is riding a chair lift up the mountain. The toe of the snow scooter rider's boot is engaged under the toe strap such that the weight of the snow scooter is supported by the toe portion of the boot while transporting the snow scooter up the mountain. The front plate assembly is provided with an attachment ring 60 or other means, so that a runaway strap 62 may be clipped, or otherwise attached, between the snow scooter and the operator's boot. The runaway strap attaches securely to the rider's boot at one end and to the front plate assembly at the other end by a spring closed clip. A D-ring (not shown) is incorporated into the portion of the runaway strap that attaches to the rider's boot such that the clip end of the runaway strap may be attached to the D-ring and conveniently stowed out of the way when not in use.

Figure 7:
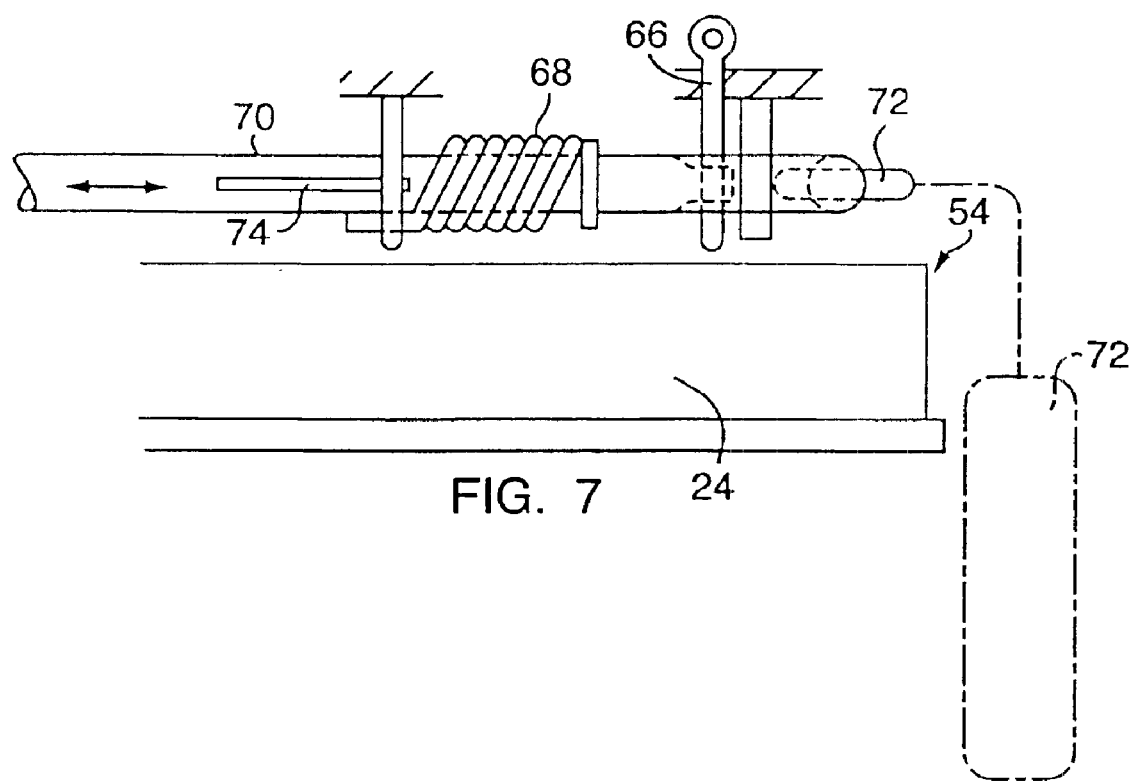
FIG. 7 is a somewhat schematic view of a braking/tipping mechanism for use with the snow scooter of FIG. 1.

The snow scooter 20 may also be provided with a braking/stopping mechanism, as shown in FIG. 7, to stop the snow scooter should the operator and the snow scooter "part company". The brake is actuated by the displacement of a pull pin 66 attached to one end of a tether (not shown) fastened at its other end securely to the snow scooter operator. When the pin 66 is pulled a spring loaded mechanism causes a metal, plastic, or composite blade to aggressively push against the snow surface causing the snow scooter to tip over onto its side thus arresting its continued motion down the slope. In the embodiment of such a braking mechanism as shown by FIG. 7, when the pull pin 66 is pulled, a torsion and compression spring 68 forces the shaft 70 with a braking/tipping blade 72 out of its riding position nested into the foot platform 50 and beyond the edge of the snowboard 24 and then twists the shaft to bring the blade 72 into a position perpendicular to the bottom of the snowboard, as shown by the broken lines of FIG. 7, thus stopping or tipping the snowboard over. A key 74 prevents the shaft 70 from rotating until the spring 68 has forced the shaft 70 to slide to the right to a position where the blade 72 will clear the edge of the snowboard before the blade 72 is forcefully rotated into its stopping position by the spring's torsional force. To recock the mechanism the blade 72 is manually rotated to a position parallel to the board and then manually slid sideways into its stowage position and held in that position until the pull pin 66 is reinserted to hold the blade in its cocked position. The design of the device is not limited to this form only. Another configuration would include a hand brake lever on the handle bar that would actuate the brake when released, by hand or by pull pin, and retract the brake when the lever is pulled or squeezed.

It is important that the snow scooter operator maintain secure footing with operating the apparatus. To achieve this, snow scooter's foot platform 54 is preferably equipped with a high friction anti-skid surface sheet or layer bonded to the top surface of the remainder of the platform in the area where the rider's feet are placed during operation of the snow scooter. The friction surface sheet or layer is made of material with a textured anti-skid surface or from a high friction high density foam plastic or rubber material bonded to the top surface of the remainder of the platform. The friction surface sheet or layer may be designed as two foot pads for the two feet of the rider. The anti-skid sheet or layer is designed to shed snow while providing good traction between the rider's booted feet and the foot platform so that the rider's feet do not slip or slide on the foot platform in a manner such as to inhibit good operation of the snow scooter.

The snow scooter apparatus 22 is designed to hold the foot platform 54 to the snowboard 24 by way of attachment points for mounting the platform to the front plate assembly 26 and the rear plate assembly 40. The attachment points at the rear of the platform are fixed relative to the snowboard 24 by the rear of the platform being securely attached to the rear mounting plate assembly 40. The attachment point at the front of the platform is a sliding junction which allows movement longitudinally by the snowboard between the platform and the front mounting plate assembly 26 to compensate for changes in distance between the front and rear mounting plate assemblies 26 and 40 when the snowboard flexes. The sliding junction captures the front of the platform by the front mounting plate assembly 26 so that the front of the platform can not move from side to side or up and down. The front of the platform can only move in relationship with the front mounting plate assembly along the longitudinal axis of the snowboard. The platform may be constructed of any variety of materials or combinations thereof, including but not restricted to, laminated wood, metal, plastic composites and/or structural foam. The platform 54 is generally rectangular in shape and with rounded corners. The platform may be narrowed at the waist to follow the side cut profile of the snowboard. As mentioned above, the platform preferably features a high friction top surface designed to shed snow and to provide good footing (foot traction). The platform is constructed to a width dimension sufficient to accommodate two booted feet placed side by side. The foot platform is constructed to a length dimension approximately two boot lengths in measure to allow the operator to shift his weight forward or backward along the longitudinal centerline of the snowboard.

Figure 11:
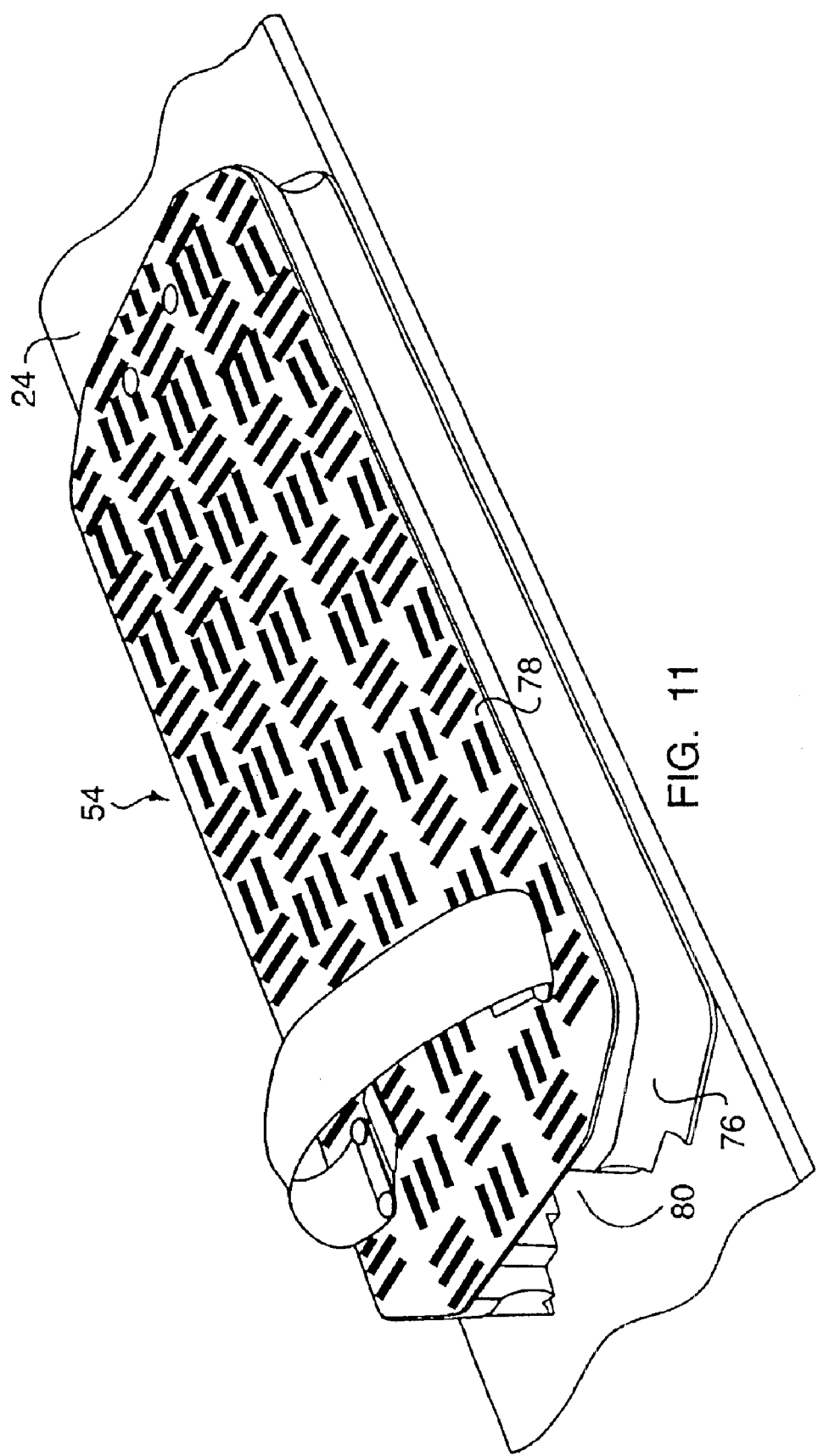
FIG. 11 is a perspective view of the foot platform of the snow scooter in FIG. 1.
Figure 12:
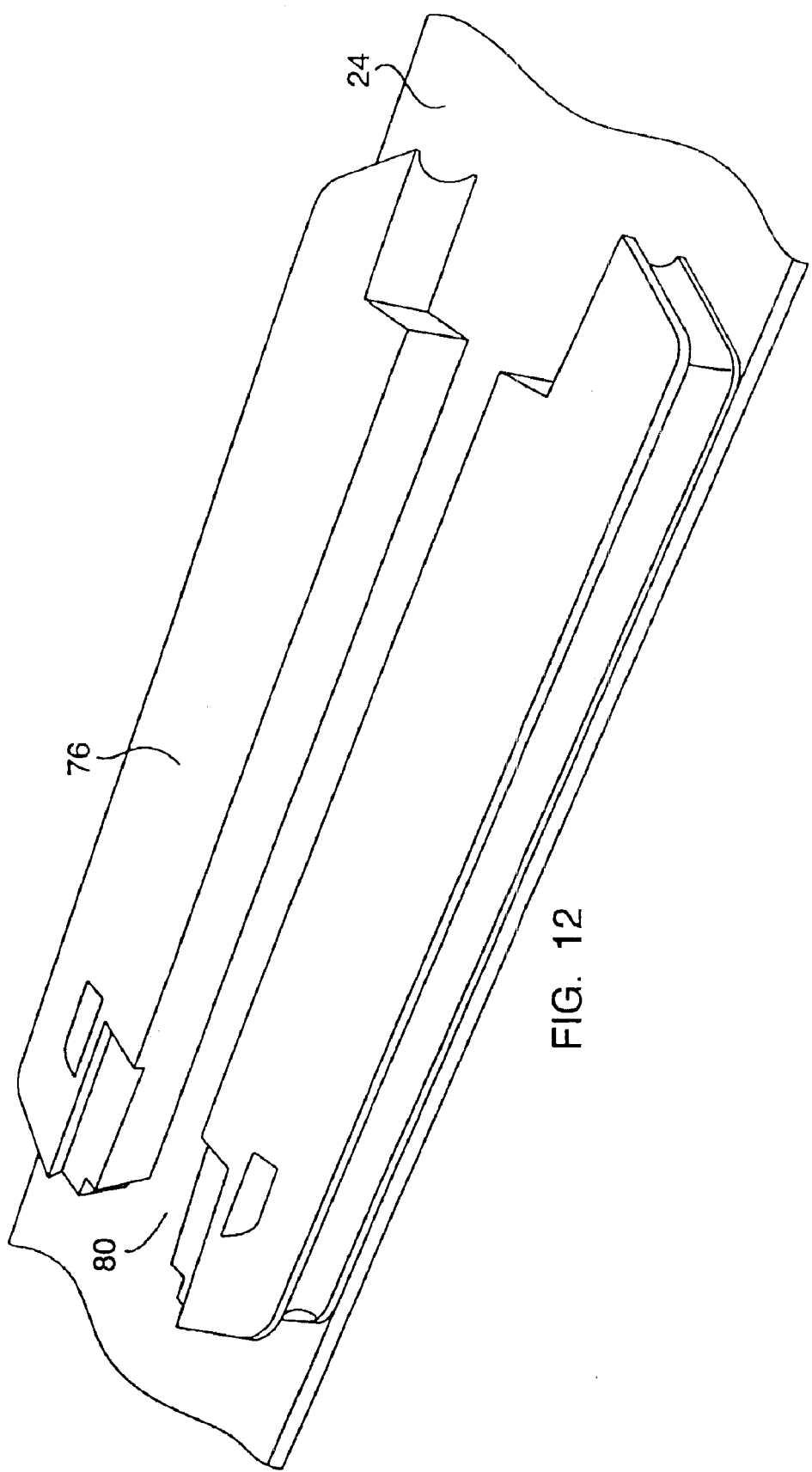
FIG. 12 is a view similar to FIG. 11, but with the top plate of the platform shown removed.

As shown in FIGS. 11 and 12, the platform 54 is made up of a compressible semi-rigid body 76 of foam rubber, plastic or the like, and a flexible non-compressible top sheet 78 of metal or plastic with an anti-skid top surface. The body has a recess 80 for receiving the torsion member 32 and it holds the top sheet 78 above the torsion member 32 while filling the space between the top sheet 78 and the top surface of the snowboard, to prevent entry of snow into that space to allow the snowboard to flex.

Figure 18:
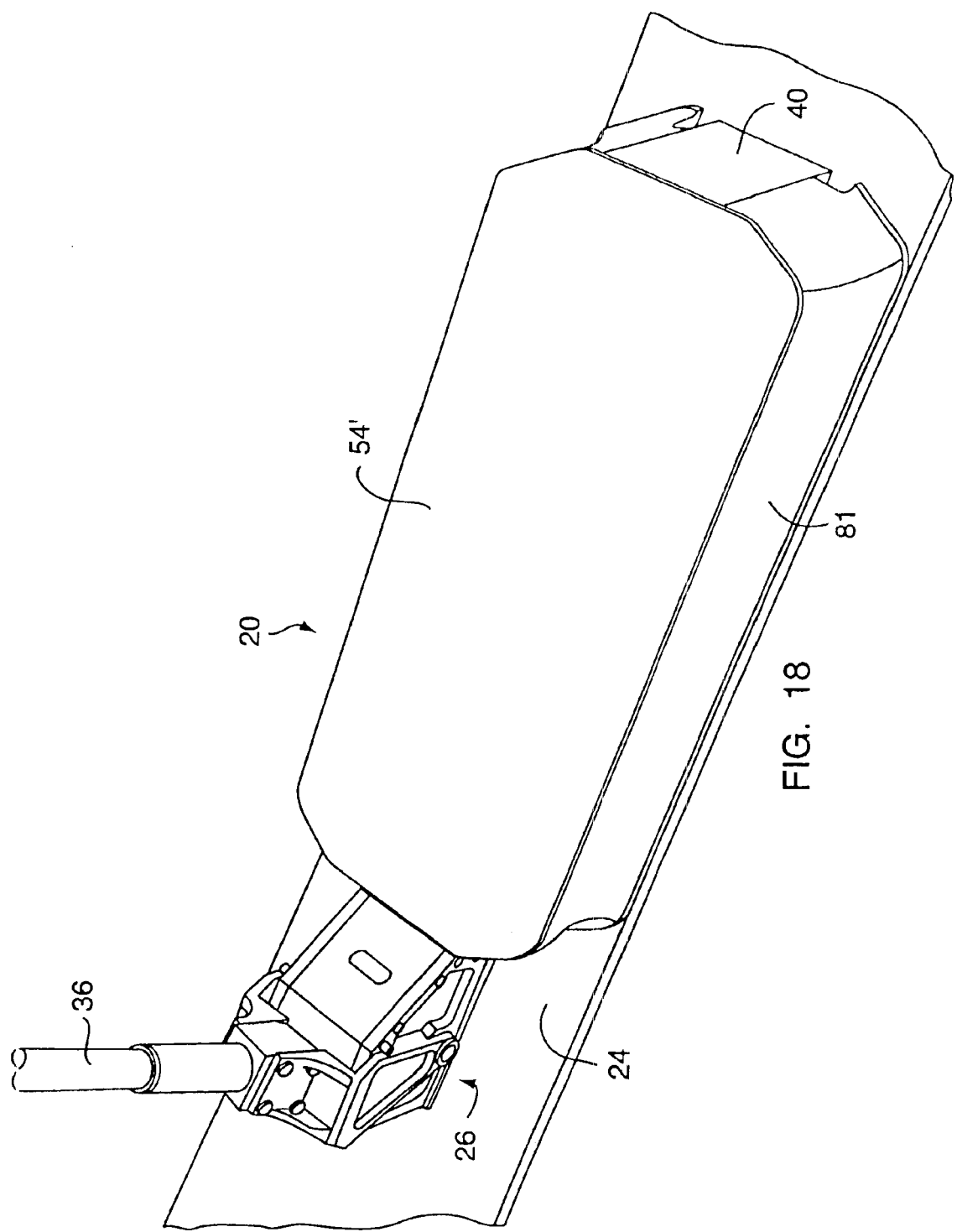
FIG. 18 is a perspective view showing another alternative form of foot platform (with snow skirt) for use in the snow scooter of FIG. 1.

The foot platform may also be designed as a single rigid piece 54' accompanied by an auxiliary snow skirt 81, extends along the periphery of the piece 54' and between the piece 54' and the top of the snowboard, as shown in FIG. 18, made from a strip of foam material, or some similar means to keep snow from entering, collecting and packing underneath the foot platform while nevertheless, permitting flexing of the snowboard.

Figure 15:
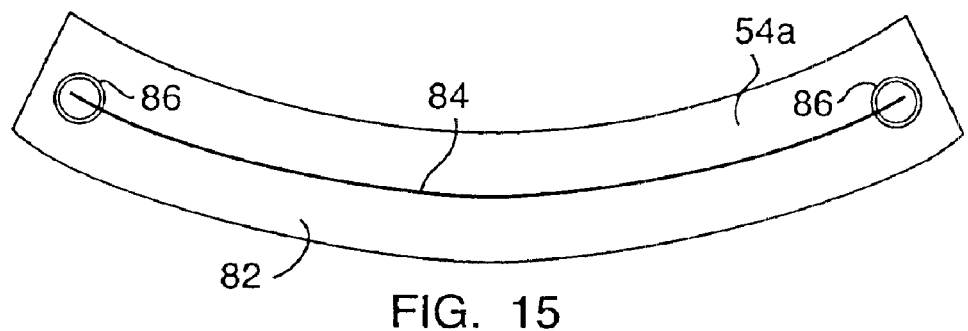
FIG. 15 is a side view of an alternative form of foot platform for use in the snow scooter of FIG. 1.
Figure 16:
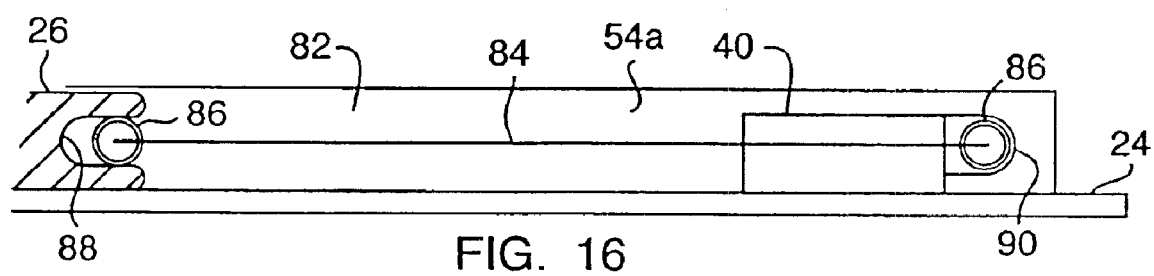
FIG. 16 is a side view showing the foot platform of FIG. 15 attached to a snowboard.
Figure 17:
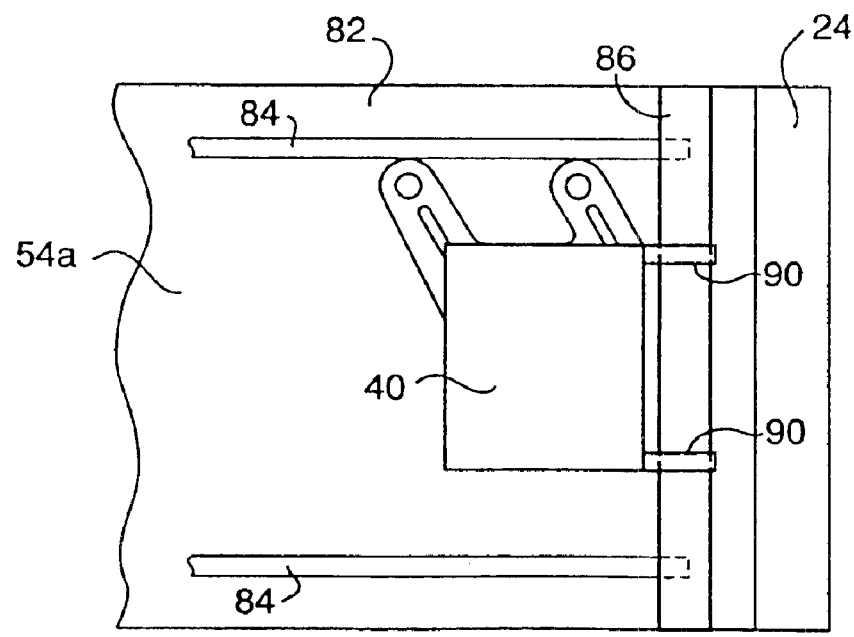
FIG. 17 is a schematic plan view of the right portion of FIG. 16.

The snow scooter apparatus 22 may also be designed with an alternate flexible foot platform 54a with attachment points for mounting to the front plate assembly 26 and the rear plate assembly 40 as shown in FIGS. 15, 16, and 17. The attachment between the rear of the foot platform 54a and the rear plate assembly 40 is fixed by the rear portion of the platform 54a being securely attached to the rear mounting plate assembly 40. The attachment point at the front of the foot platform 54a is a sliding junction which allows movement between the foot platform 54a and the front mounting plate assembly 26 to compensate for the change in distance between the front and rear mounting plate assemblies when the snowboard flexes. The sliding junction captures the front of the platform so that it can not move from side to side or up and down. It can only move in relationship with the front mounting plate assembly along the longitudinal axis of the snowboard. The foot platform 54a is constructed of a top sheet of metal, plastic, composite, or other material laminated to a block, or blocks 82, of flexible material which is/are mounted in intimate contact with the snowboards top surface. Embedded in the block or blocks 82 are two longitudinally extending leaf spring 84; and two attachment tubes 86, with slots to receive the springs 84, are slidably receivable in holes going laterally through the block or blocks 84 at the front and rear ends of the block or blocks 82, respectively. The flexible foot platform is prefabricated with a preset curve, as seen in FIG. 15, such that, in its unstressed and unattached condition, it is concave on the top surface and convex on the bottom surface and has the characteristic that it wants to spring back to its original curved form when an attempt is made to flatten it.

When the foot platform 54a is attached to the snowboard the front of the platform is slidably engaged, by way of a tube 86, with a recess 88 in with the front mounting plate assembly 26. Then the rear of the foot platform is the pushed down and fixedly attached to two mounting ears 90 on the rear mounting plate assembly by sliding a tube 86 through the block or blocks 82 and through the mounting ears 90. The spring action resulting from flattening the pre-curved foot platform keeps the bottom of the platform firmly pressed against the top surface of the snowboard even when the snowboard is flexing while following the contours of the snow surface below. Since the bottom surface of the platform is held firmly against the snowboard's top surface it is not possible for snow or ice to enter, collect or pack underneath the platform.

Figure 8:
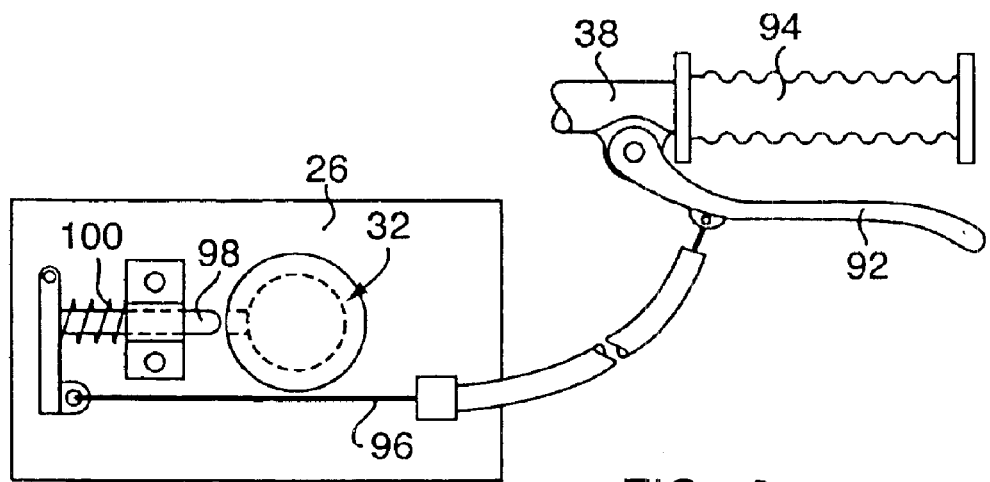
FIG. 8 is a somewhat schematic view of a torque tube lock for use with the snow scooter of FIG. 1.

There may be occasions when it is desirable to lock the torque tube assembly 32 to the front plate assembly 26 to prevent twisting of the snowboard along its longitudinal axis between the front plate assembly 26 and the rear plate assembly 40. FIG. 8 shows an exemplary mechanism which may be included in the apparatus 22 to allow for such locking of the torque tube assembly 32 when such occasions arise. Referring to FIG. 8, a torque tube lock drawing: hand lever 92 is located at one hand grip 94 of the T-handle 38. When the hand lever 92 is pulled the attached cable 96 is placed in tension and the tension force causes a spring loaded lock pin 98 to slide towards the torque tube assembly 32. A tapered nose on the lock pin enters a hole in the torque tube assembly 32, which action locks the torque tube and prevents its rotation with respect to the front plate assembly 26. When the handle 92 is released a spring 100 returns the pin to the unlocked position and the torque tube is once again free to rotate.

Figure 2:
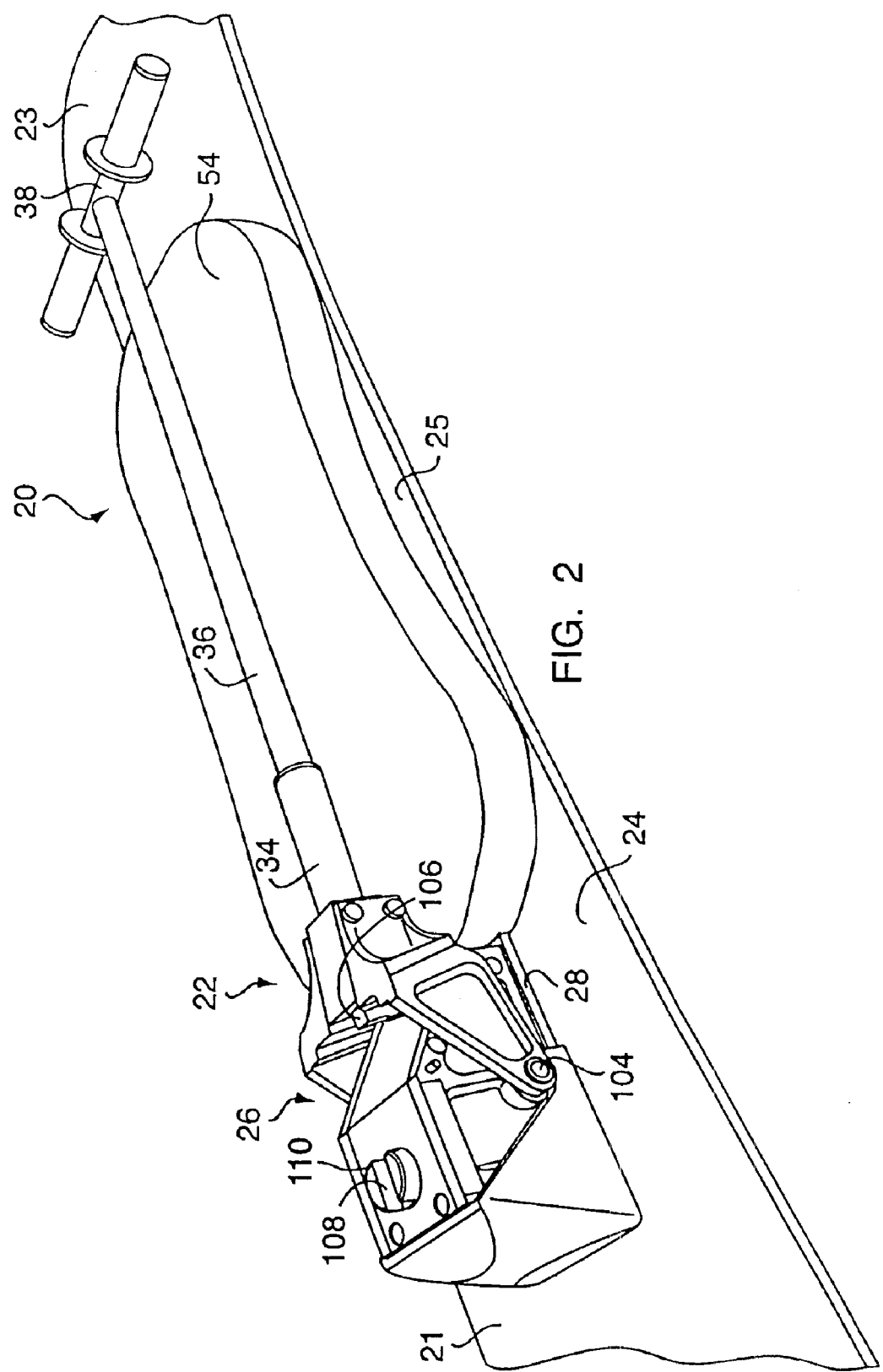
FIG. 2 is a perspective view of the snow scooter of FIG. 1 shown in a folded or stowed condition for transport.
Figure 3:
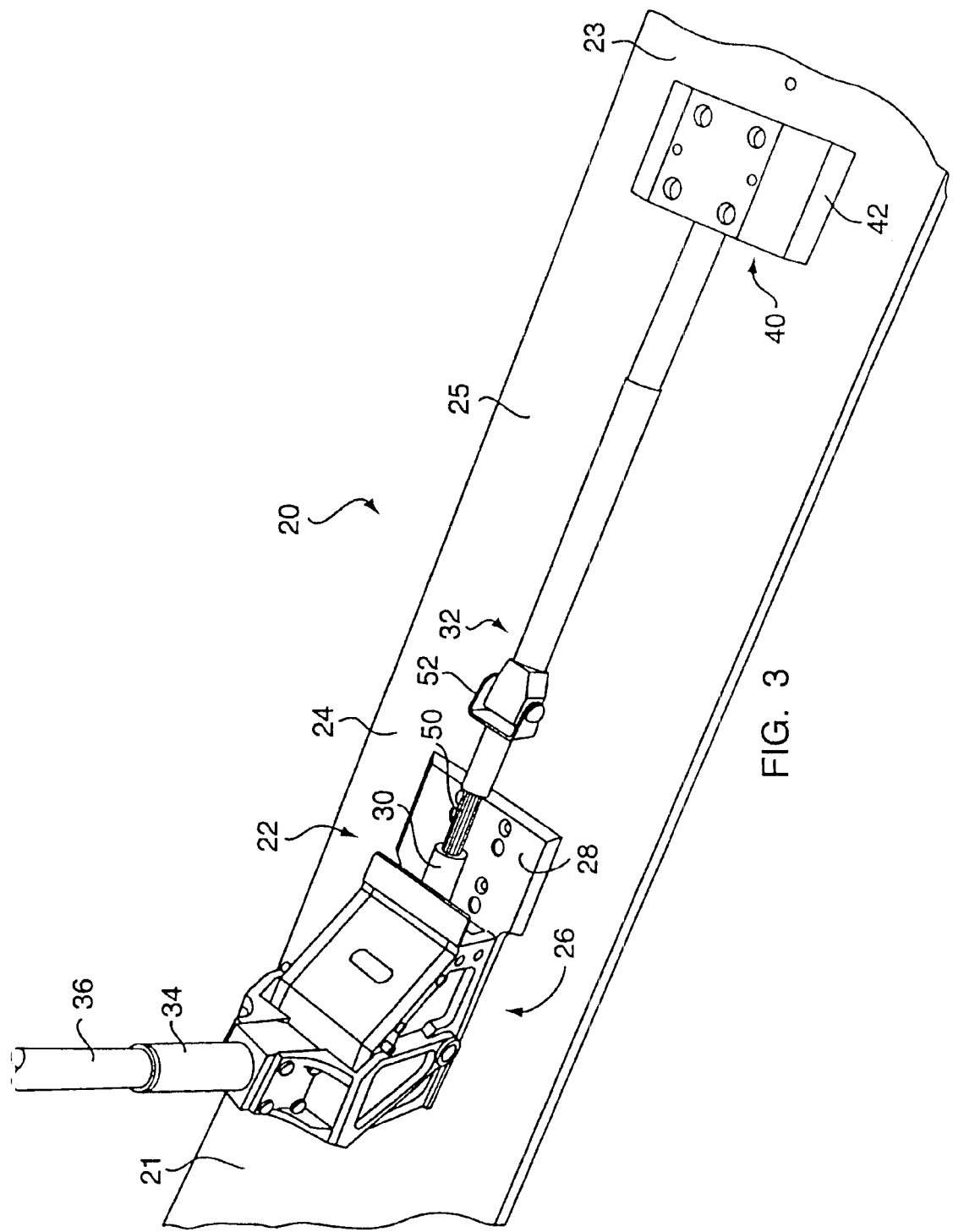
FIG. 3 is a perspective fragmentary and enlarged scale view of the snow scooter of FIG. 1, with some parts removed for clarity, showing parts of the apparatus in greater detail.

The vertical control member 32 during use of the snow scooter 20, as seen in FIG. 1, extends generally upwardly from the snowboard 24, and at its lower end the member 32 is held by the front plate assembly 26 against all movement relative to the snowboard 24 except for torsional rotation above its vertical axis. Therefore the member 32 can be rocked from side to side by the rider 27 to twist the front portion 21 of the snowboard to one side or the other, and it can be pulled upwardly or be pushed downwardly or be pushed forwardly or pushed rearwardly by the rider to raise or lower the front portion 21 relative to the remainder of the snowboard. However with the member 32 in its upright position the scooter 20 may be cumbersome to transport in a car or otherwise. Therefore, the member 32 is preferable designed with a hinged connection to the front plate assembly 26 at the base such that the member may be folded down to a position parallel with the surface of the snow scooter's foot platform, as shown in FIG. 2. This is a desirable feature which makes it more convenient to transport the snow scooter to and from ski slopes. When the member 32 is folded down the member 32 itself makes a convenient handle with which to carry the device, the snow scooter requires less storage space in the home or vehicle, and the snow scooter is also safer to transport on a ski rack on the roof of the vehicle.

To allow for the folding movement of the vertical control member 32, the front plate assembly 26 includes a yoke member 102 which carries the vertical control member 36 and which is movable between the upright and folder conditions of the vertical control member 36 by movement relative to the base plate 28 about a transverse pivot axis defined by a pivot pin 104. At its bottom end the control member 32 has a generally rectangularly shaped tongue 106 which, when the control member 32 is in its upright position is drivingly received in a correspondingly shaped slot 108 in a stub shaft 110 which is rotatably supported by associated parts of the front plate assembly 26 and which at its lower end fixedly carries the bevel gear segment 44. Thus, when the member 36 is in its upright position torsional movement of the member is transferred to the forward end of the torque tube assembly 32 through the tongue 106, stub shaft 110, bevel gear segments 44 and 46 and stub shaft 48. When the control member 32 is moved to the folded position the tongue 106 moves out of driving engagement with the stub shaft 110.

Figure 9:
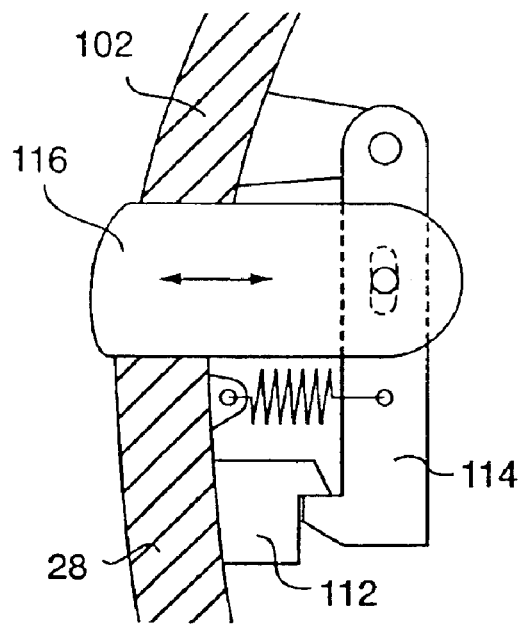
FIG. 9 is a somewhat schematic view of a latch and shear release assembly for holding the vertical control member of the snow scooter of FIG. 1 in its deployed upright position.
Figure 10:
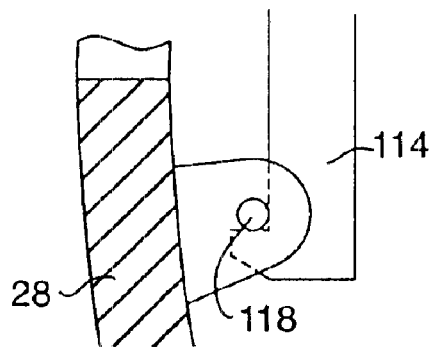
FIG. 10 is a somewhat schematic view of an alternative form of latch and shear release assembly which may be used in place of that of FIG. 9.

If the control member 32 is foldable as described above, a suitable latch mechanism is included in the apparatus 22 to releasably hold the control member 32 in its upright position during use. Such latch mechanism may take various forms, and preferably it is one such as shown by FIG. 9 or FIG. 10 including a shear force release feature. Referring first to FIG. 9, the latch mechanism shown there incorporates a shear block 112 fixed to the base plate 28 of the front plate assembly 26 and a spring biased pivoting latch member 114 carried by the yoke member 102. FIG. 9 shows the latch in its latched condition at which the control member is in its upright position. The shear block 112 is designed to fail well before the material comprising control member 32 reaches its structural yield point and bends or breaks when the T-handle is subjected to excessive force to the rear as might occur during a fall. A finger actuatable release button 116 enables release of the latch member 114 for folding of the control member to its folded position. Referring to FIG. 10, the latch mechanism shown thereby is similar to that of FIG. 9 except that the shear block 112 of FIG. 9 is replaced by the shear pin 118. In this case a rider may carry one or more spare shear pins with him during riding to permit him to replace a broken shear pin on the slope and to continue riding the snow scooter following such shear pin replacement. A second latch (not shown) may be provided to lock the control member 32 in its folded position.

Figure 14:
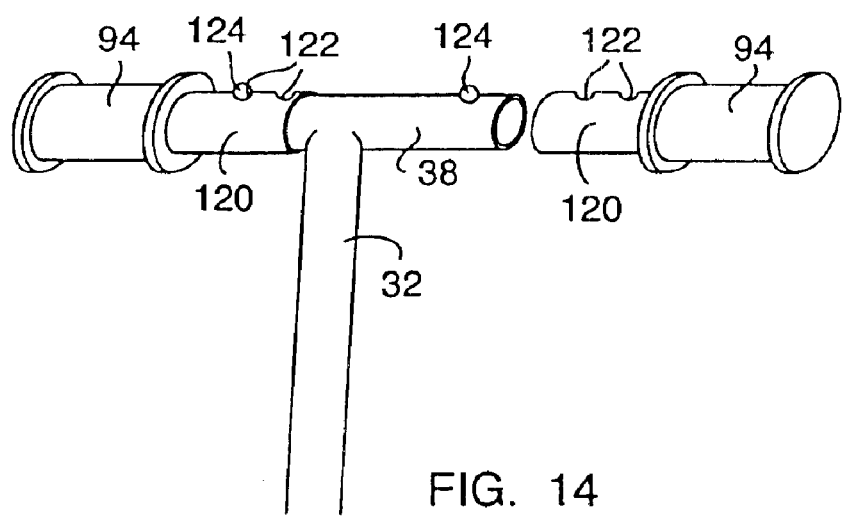
FIG. 14 is a fragmentary perspective view of the top portion of the vertical control member of the snow scooter of FIG. 1 and showing an adjustability of its hand grips.

For optimal performance on the slopes it is desirable that the hand grips 94 be spaced about a shoulder width apart. Said width allows adequate force to be applied to the snow scooter's torque tube to control the snowboard's rear edges in a manner to cover all aspects of operation without the need for the application of excessive force by the operator. However said width is inconvenient when transporting or storing the snow scooter. Therefore an adjustable width T-handle is preferably provided as an option for the snow scooter. Such an adjustable width T-handle is shown in FIG. 14 wherein tubular end portions 120 carrying the hand grips 94 telescope over the ends of the remaining portion of the T-handle and are provided with a number of detent holes 122 which cooperate with spring based detent portions 124 on the remaining portion of the T-handle to releasably lock the hand grips at various positions.

Major brand conventional snowboards are customarily provided with binding mounting holes with threaded inserts installed at the factory. These mounting holes come in two basic patterns. The majority of these snowboards are supplied with holes in square patterns of 40 mm×40 mm. A second popular pattern is a rectangular pattern of 43 mm×50 mm. The snow scooter's front and rear mounting plates 28 and 42 are designed to be mounted using either pattern.

Figure 13:
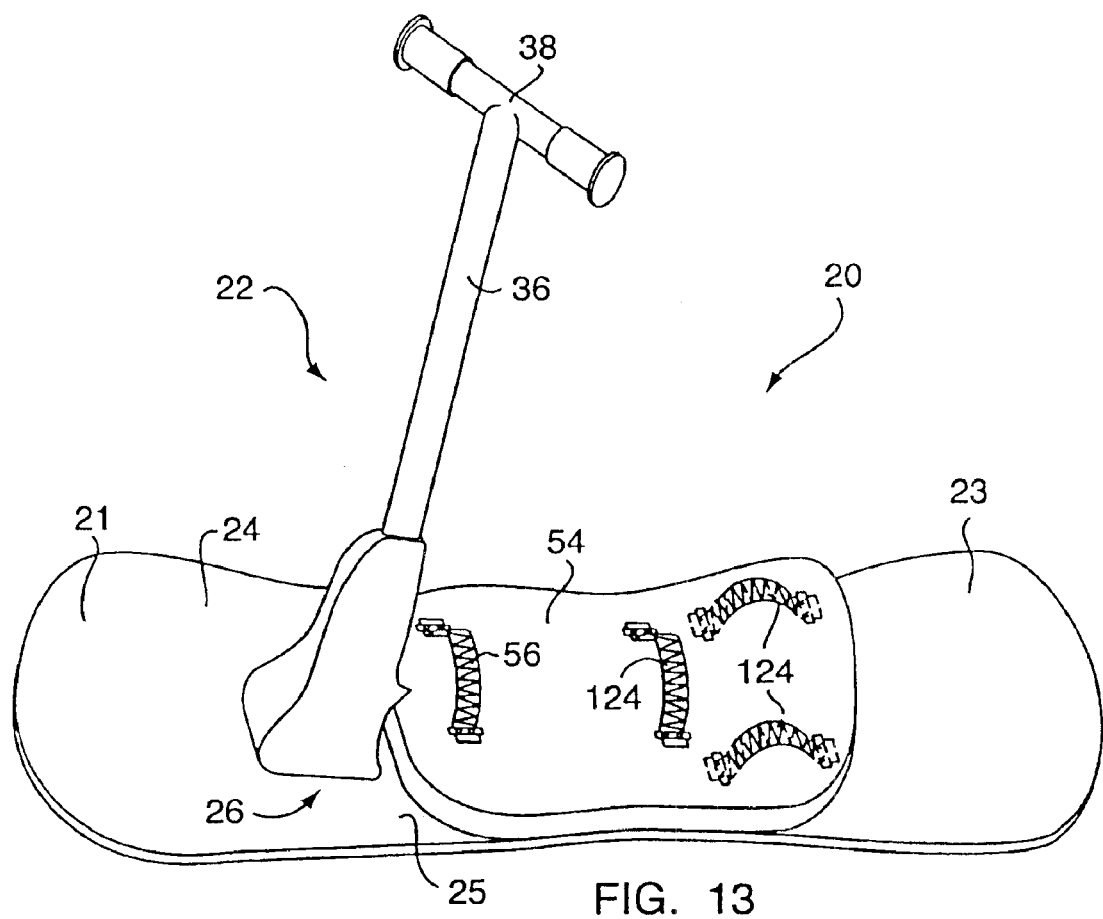
FIG. 13 is a view showing the snow scooter of FIG. 1 equipped with a rear toe strap on its foot platform.

On occasion, especially when operating on steep difficult terrain or when performing trick maneuvers, the operation of the snow scooter 20 may be facilitated by the use of a rear toe strap such as shown at 124 in FIG. 13. With the toe of the boot of the rear foot tucked firmly into the rear toe strap 124 it becomes easier to manipulate the rear portion 23 of the snowboard during difficult moves. The rear toe strap 124 also makes it easier to stay in control of the snow scooter 20 during jumps and other aerial maneuvers. The toe strap 124 may be mounted on the rear of the foot platform 54 in a number of different positions according to the operator's preference. The solid lines of FIG. 13 show for example one position for the toe strap 124, and the broken lines show still other optimal positions for the toe strap.

In the above described embodiment of the invention concerning the snow scooter, 20, the rider 27 of the scooter has the ability at will to cause a twisting movement of the rear portion 23 of the snowboard relative to the front portion 21 to facilitate the execution of turns and other maneuvers; and this is accomplished by the rider torsionally rotating the vertical central member 36 about its vertical axis using the T-handle 38. In keeping with the broader aspects of the invention it is contemplated that the desired twisting of the rear snowboard portion relative to the front portion at the will of the rider may be accomplished in other ways. For example, FIG. 19 shows a snowboard 20a in which the vertical control member 36 is omitted.

Figure 19:
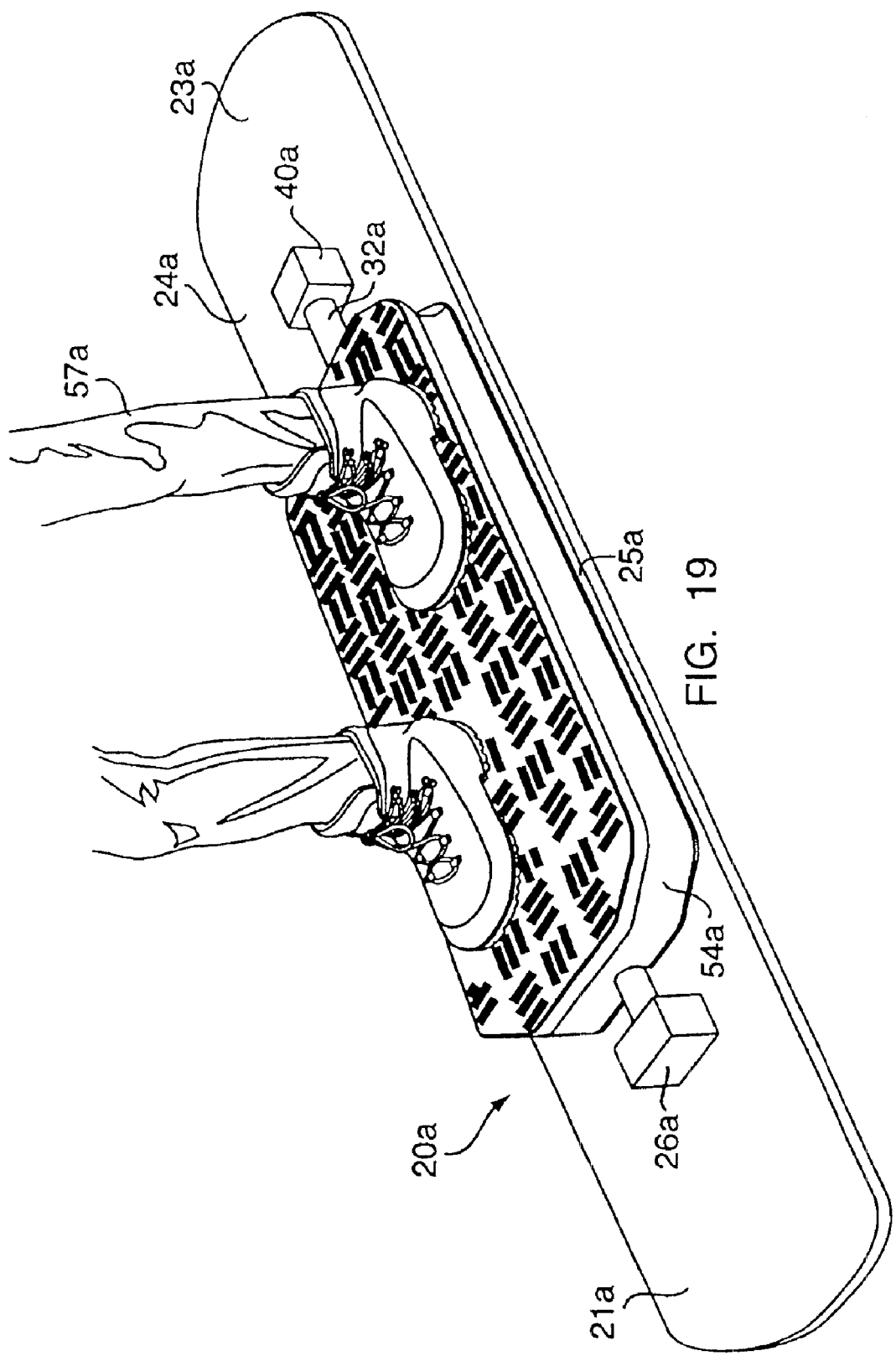
FIG. 19 is a perspective view of a snow scooter comprising another embodiment of the invention in process of being ridden by a rider.

Referring to FIG. 19, the snowboard 20a is made up of some parts which are substantially similar to corresponding ones of the snowboard 20 of FIGS. 1 to 18, and such parts are given the same reference numbers (along with the letter "a") in FIG. 19 as used in FIGS. 1 to 17, and these parts are not here redescribed in detail. In the case of the snowboard 20a the foot platform 54a is a rigid board or plate spaced above the top surface of the snowboard and fixed by suitable connecting parts (not shown) directly to the torque tube assembly 32a. The torque tube assembly 32a is in turn supported in vertically spaced relation to the snowboard 24a at its front and rear ends by the front and rear plate assemblies 26a and 40a, respectively. The rear end of the torque tube assembly 37a is fixed to the rear plate assembly 40a and the front end of the torque tube assembly 32a is rotatable relative to the front plate assembly 26a. Suitable means such as the above described universal joint 52 and spline joint 50 are used to accommodate changes in length between the plate assemblies 26a and 40a due to snowboard flexing.

In use of the snowboard 20a a rider 57a stands on the foot platform 54a, as shown in FIG. 19, and during the riding of the snowboard 20a the rider can shift his weight from one foot to the other to rock the foot platform from one side to the other relative to the snowboard, and this rocking motion of the foot platform 54a is converted by the torque tube assembly 32a and the front and rear plate assemblies 26a and 40a into twisting of the rear portion 23a of the snowboard to one side or the other relative to the front snowboard portion 21a.

In FIG. 19 the fixing of the foot platform 54a directly to the torque tube assembly is used without the snow scooter having any vertical control member similar to the vertical control member 36 of FIGS. 1–18. However, if desired, the fixing of the foot platform to the torque tube member may also be used with a snow scooter having a vertical control member. In this latter case the snow scooter may be one essentially similar to the snow scooter 20 of FIGS. 1–18 except for its foot platform being fixed to the torque tube assembly 32 and being rockable relative to the snowboard, so that twisting forces are applied to the rear snowboard portion 23 by rocking of the foot platform, and so that these foot platforms create twisting forces supplement the twisting forces applied by the twisting of the vertical control member about its vertical axis; or the snow scooter may be one wherein a vertical control member is fixed rigidly to the front portion 21 of the snowboard during riding (without being movable in torsion about the vertical axis) and the rider applies twisting forces on the rear portion of its snowboard only through rocking of the foot platform.

Having now described various snow scooters comprising embodiments of the invention, a method for using such a scooter, which includes a vertical control member transitionally fixed to the snowboard and a means operable by the rider to twist the rear portion of the snowboard relative to the front position of the snowboard, is described as follows:

The rider riding the scooter starts off directly downhill (down the "fall-line), with everything straight and balanced. He then rocks the control member to one side, riding the uphill edge, and leans into the hill to counter the centrifugal force caused by turning. At this stage the turn can be either "carved", or "skidded" as described above. Carving would require a moderate twisting force applied to the rear portion of the snowboard to compensate for the torsional flexibility of the snowboard. In the case of the scooter being one such as shown as 20 in FIGS. 1–18 it would mean a turning of the T-handle 38 in the direction opposite to that of the turn. Skidding would require a twisting of the snowboard portion in the opposite direction, as achieved with the scooter 20 by twisting the T-handle in the direction of the turn, in much the same way as an automobile can be over-steered and skidded.

To initiate a turn back though the fall-line, the rider puts the same twist into the board he would do with his feet alone if riding a conventional snowboard—allowing the front portion of the snowboard to "slip", while the rear portion still bites. In the case of riding the scooter 20 this would be done by turning the T-handle 38 downhill. The "slip" turns the board back toward the fall-line and permits the rider to start another "carving" or "skidding" turn in the opposite direction. Repetition of this sequence results in a series of slow or quick slalom turns, depending upon speed of execution.

The system of the present invention has widespread application among individuals who are uncomfortable with the traditional manner of riding a snowboard as well as those winter sports enthusiast who are seeking a different and more enjoyable experience.

What is claimed is:

1. An apparatus for forming a snow scooter by attachment of the apparatus to a snowboard having front and rear portions and a middle portion between the front and rear portions onto which middle portion a rider is positioned during use of the snow scooter, said apparatus in a condition of its being attached to the snowboard such as aforesaid comprising:

a movable member located above the snowboard and movable by the rider back and forth along a movement path relative to the snowboard, and a motion transmitting mechanism operable between the movable member and the rear portion of the snowboard for twisting the rear portion of the snowboard back and forth, about an axis extending longitudinally of the snowboard, relative to the front portion of the snowboard in response to said back and forth movement of the movable member by the rider along said movement path, the motion transmitting mechanism including a front plate assembly attached to the front portion of the snowboard, a rear plate assembly attached to the rear portion of the snowboard, and a torque transmitting assembly extending longitudinally of the snowboard between the front plate assembly and the rear plate assembly, the torque transmitting assembly having a rear end fixed torsionally to the rear plate assembly and having a front end rotatable relative to the front plate assembly, and means for transferring the back and forth movement of the movable member to the front end of the torque transmitting assembly as torsional movement of the front end of the torque transmitting assembly, the torsional movement being transmitted through the torque transmitting assembly to the rear plate assembly so as to cause the twisting of the rear portion of the snowboard relative to the front portion of the snowboard.

2. An apparatus for forming a snow scooter as defined claim 1, wherein:
   said movable member is a member grippable by the hands of the rider for movement back and forth along said movement path.

3. An apparatus for forming a snow scooter as defined in claim 1, wherein:
   said movable member is one movable back and forth along said movement path by the feet of the rider.

4. An apparatus as defined in claim 2, wherein:
   said movable member is a handle bar having two hand grips grippable respectively by the two hands of the rider.

5. An apparatus as defined in claim 3, wherein:
   said movable member is a foot platform spaced above said snowboard and adapted to be stood upon by the rider, and
   means supporting said foot platform for pivotal movement relative to the snowboard about a pivot axis extending longitudinally of the snowboard so that the platform can be rocked in one direction or the other about said pivot axis by the rider shifting his weight as applied through his feet to the platform.

6. An apparatus as defined in claim 1, wherein:
   said motion transmitting mechanism further includes a vertical control member extending vertically upwardly from said front plate assembly and carrying said movable member at an upper end of the vertical control member.

7. An apparatus as define in claim 6, wherein:
   said vertical control member is restrained against translational movement relative to said front plate assembly, except for torsional movement about its own longitudinal axis so that the rider cart rock said vertical control member to one side or the other of a longitudinal axis of the snowboard to twist the front portion of the snowboard in one direction or the other about the longitudinal axis of the snowboard, and so that the rider can also pull up or push down on or push forwardly or pull backwardly the vertical control member to respectively raise or lower the front portion of the snowboard relative to the remainder of the snowboard.

8. An apparatus as defined in claim 7, wherein:
   said vertical control member is supported for movement by said front plate assembly for torsional movement of said vertical control member about the vertical axis of the vertical control member, and
   the motion transmitting mechanism includes a mechanism for converting the torsional movement of said vertical control member about its vertical axis to rotational movement of said front end of said torque transmitting assembly.

9. An apparatus as defined in claim 1, wherein:
   said torque transmitting assembly includes a mechanism for accommodating changes in the length of the spacing between the front plate assembly and the rear plate assembly caused by flexing of the snowboard.

10. An apparatus as defined in claim 9, wherein:
    said mechanism for accommodating changes in length includes a universal joint and a spline connector located between said front and rear ends of the toque transmitting assembly.

11. An apparatus as defined in claim 1, wherein:
    a foot platform covering the torque transmitting member, and including a substantially rigid tap portion, onto which the rider stands, and
    a means located between said rigid top portion and the top surface of the snowboard to prevent snow from entering the space between said rigid top portion of the platform and the top surface of the snowboard.

12. An apparatus as defined in claim 11, wherein:
    said foot platform has a rear end portion fixed relative to said rear plate assembly and a front end portion slidable relative to said front plate assembly.

13. An apparatus as defined in claim 12, wherein:
    said foot platform before its attachment to the snowboard has a top surface with a concave curvature and the platform is resilient so that in attaching the foot platform to the snowboard one end of the foot platform can be first attached to the snowboard and than the other end of the foot platform can be pressed downwardly into engagement with the snowboard against the resiliency of the foot platform so that after the attachment of the foot platform to the snowboard the resiliency of the foot platform holds a bottom surface of the foot platform snuggly against the top surface of the snowboard to prevent entry of snow into space between the foot platform and the snowboard.

14. An apparatus as defined in claim 1, wherein:

said apparatus is adapted for connection to one end of a tether extending between the apparatus and the rider to prevent the snow scooter from moving far from the rider in the event of a fall.

15. An apparatus as defined in claim 11, wherein:

said foot platform includes a foot strap at a forward end portion of the foot platform for receiving the toe of a boot worn by the rider when the rider is riding a chair lift with the scooter.

16. An apparatus as defined in claim 15, wherein:

said apparatus includes a connector for receiving one end of a foot tether connected to the boot of the rider which is received in the toe strap during riding of a chair lift to prevent loss of the scooter in the event the boot becomes disengaged from the toe strap.

17. An apparatus as defined in claim 1, wherein:

said apparatus includes a braking/tipping mechanism actuatable to move the scooter to a braked or tipped position in the event of a fall separating the rider from the scooter.

18. An apparatus as defined in claim 17, wherein:

said braking/tipping mechanism includes a spring loading braking/tipping member movable relative to the snowboard between a stowed position and a deployed position, which braking/tipping member is held in its stowed position by a pull pin connectable to the rider by a tether so that falling of the rider from the snowboard effects pulling of the pull pin to release the braking/tipping member for movement by its spring loading from its stowed to its active position.

19. An apparatus an defined in claim 1, wherein:

said apparatus includes means for releasably locking said torque transmitting assembly against rotation of said torque transmitting assembly relative to the snowboard.

20. An apparatus as defined in claim 19, wherein:

said locking means includes a lever operable by the hand of a rider, a latch member positioned adjacent to the torque transmitting assembly and movable into and out of locking engagement with the torque transmitting assembly, and a cable extending between the hand lever and the latch member for moving the latch member into and out of its latching relationship relative to the torque transmitting member in response to operation of the hand lever.

21. An apparatus as defined in claim 6, wherein:

said vertical control member is movable relative to the front plate assembly between an upright position used during riding of the scooter and a folded position at which the vertical control member is positioned generally parallel to the snowboard.

22. An apparatus as defined in claim 21, wherein:

the front plate assembly includes a latch for releasably holding the vertical control member in its upright position.

23. An apparatus as defined in claim 22, wherein:

said latch includes a shear member which is shearable to release the vertical control member for movement toward its folded position when an excess force is applied to the vertical control member.

24. An apparatus as defined in claim 23, wherein:

said shear member is an easily replaceable shear pin.

25. An apparatus as defined in claim 4, wherein:

said handle bar includes two hand grips for respectively receiving the two hands of the user and which hand grips are selectively movable to different positions relative to one another to change the spacing between the hand grips.

26. An apparatus as defined in claim 11, wherein:

said foot platform includes means enabling the attachment to the foot platform of a boot strap for receiving a toe portion of a boot worn by the rearward foot of the rider during riding of the scooter.

27. An apparatus as defined in claim 26, wherein:

said means for enabling attachment of a boot strap to the foot platform is such as to permit attachment of the boot strap to the foot platform at any selected one of a number of different positions relative to the foot platform.

28. A method for operating a snow scooter made by attaching an apparatus as defined by claim 6 to a snowboard, said method being executed by a rider riding the snow scooter and comprising the steps of:

starting the riding of the snow scooter by going directly down hill with everything straight and balanced, rocking the vertical control member to one side so as to ride on an uphill edge of the snowboard, leaning into the hill to counter centrifugal force caused by the turning, at this point carving the first turn by turning the movable member in a direction opposite to the turn and then initiating a second turn, back through the fall line by turning the movable member in the downhill direction to cause the front portion of the snowboard to slip while the rear portion still bites into the snow.

29. A method for operating a snow scooter made by attaching an apparatus as defined by claim 6 to a snowboard, said method being executed by a rider riding the snow scooter and comprising the steps of:

starting the riding of the snow scooter by going directly down hill with everything straight and balanced, rocking the vertical control member to one side so as to ride on an uphill edge of the snowboard, leaning into the hill to counter centrifugal force caused by the turning, at this point skidding the first turn by turning the moving the movable member in the direction of the turn, and then initiating a second turn back through the fall line by turning the movable member in the downhill direction to cause the front portion of the snowboard to slip while the rear portion still bites into the snow.

30. A snow scooter comprising:

a snowboard having front and rear portions and a middle portion between the front and rear portions onto which middle portion a rider is positioned during use of the snow scooter;

a movable member located above the snowboard and movable by the rider back and forth along a movement path relative to the snowboard, and a motion transmitting mechanism attached to the snowboard and operable between the movable member and the rear portion of the snowboard for twisting the rear portion of the snowboard back and forth, about an axis extending longitudinaily of the snowboard, relative to the front portion of the snowboard in response to said back and forth movement of the movable member by the rider along said movement path, the motion transmitting mechanism including a front plate assembly attached to the front portion of the snowboard, a rear plate assembly attached to the rear portion of the snowboard, and a torque transmitting assembly extending longitudinally of the snowboard between the front plate assembly and the rear plate assembly, the torque transmitting assembly having a rear end fixed torsionally to the rear plate assembly and having a front end rotatable relative to the front plate assembly, and means for transferring the back and forth movement of the movable member to the front end of the torque transmitting assembly as torsional movement of the front end of the torque transmitting assembly, the torsional movement being transmitted through the torque transmitting assembly to the rear plate assembly so as to cause the twisting of the rear portion of the snowboard relative to the front portion of the snowboard.

31. A snow scooter according to claim 30, wherein:

said movable member is attached to a vertical control member having a longitudinal axis extending therethrough, and said back and forth movement of said movable member is accomplished by rotating said movable member around said longitudinal axis in a first and second rotational direction.

32. An apparatus for forming a snow scooter by attachment of the apparatus to a snowboard having front and rear portions and a middle portion between the front and rear portions onto which middle portion a rider is positioned during use of the snow scooter, the apparatus in a condition of its being attached to the snowboard such as aforesaid comprising:

a movable member located above the snowboard and movable by the rider back and forth along a movement path relative to the snowboard, and a motion transmitting mechanism operable between the movable member and the rear portion of the snowboard for twisting the rear portion of the snowboard transverse, about an axis extending longitudinally of the snowboard, relative to the front portion of the snowboard in response to the back and forth movement of the movable member by the rider along the movement path.

33. A snow scooter comprising:

a snowboard having front and rear portions and a middle portion between the front and rear portions onto which middle portion a rider is positioned during use of the snow scooter;

a movable member located above the snowboard and movable by the rider back and forth along a movement path relative to the snowboard, and a motion transmitting mechanism attached to the snowboard and operable between the movable number and the rear portion of the snowboard for twisting the rear portion of the snowboard back and forth, about an axis extending longitudinally of the snowboard, relative to the front portion of the snowboard in response to the transverse movement of the movable member by the rider along the movement path.

* * * * *

UNITED STATES PATENT AND TRADEMARK OFFICE
CERTIFICATE OF CORRECTION

PATENT NO. : 6,929,267 B2
DATED : August 16, 2005
INVENTOR(S) : Daniel J. Sullivan et al.

It is certified that error appears in the above-identified patent and that said Letters Patent is hereby corrected as shown below:

Column 14,
Line 21, the word "cart" should be replaced with -- can --.
Line 48, the word "toque" should be replaced with -- torque --.
Line 52, the word "tap" should be replaced with -- top --.

Column 15,
Line 43, the word "an" should be replaced with -- as --.

Signed and Sealed this

Twenty-ninth Day of November, 2005

JON W. DUDAS
*Director of the United States Patent and Trademark Office*